May 10, 1966  G. T. GORE ETAL  3,250,245
CUTTING AND APPLICATOR MECHANISM
Filed July 15, 1963
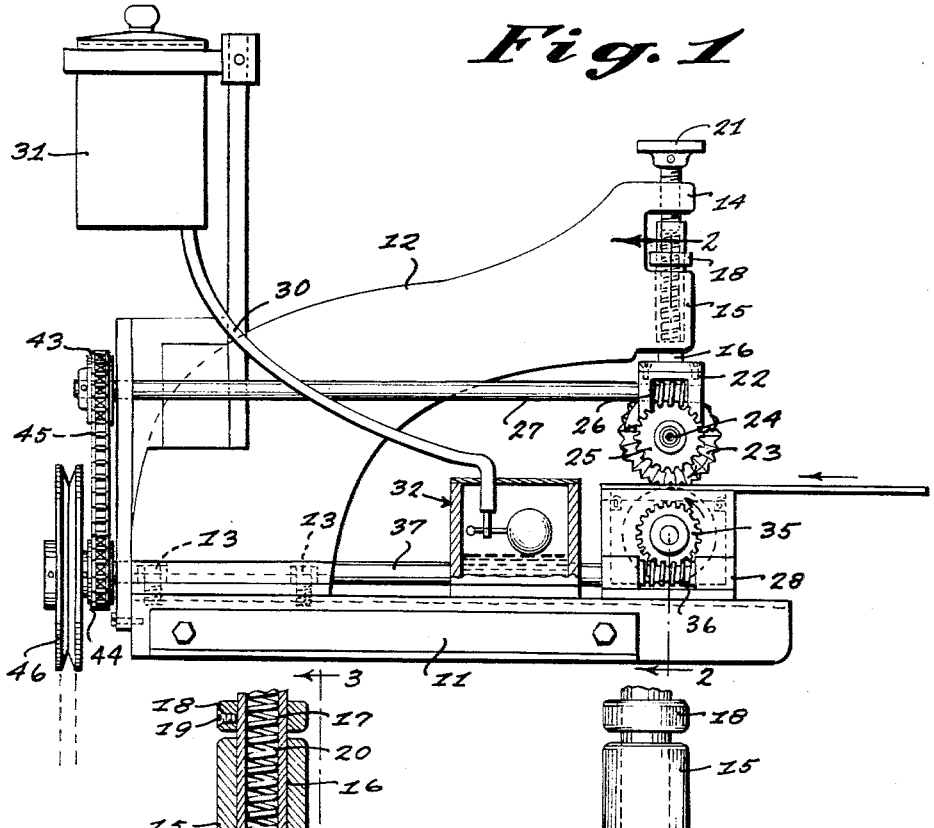
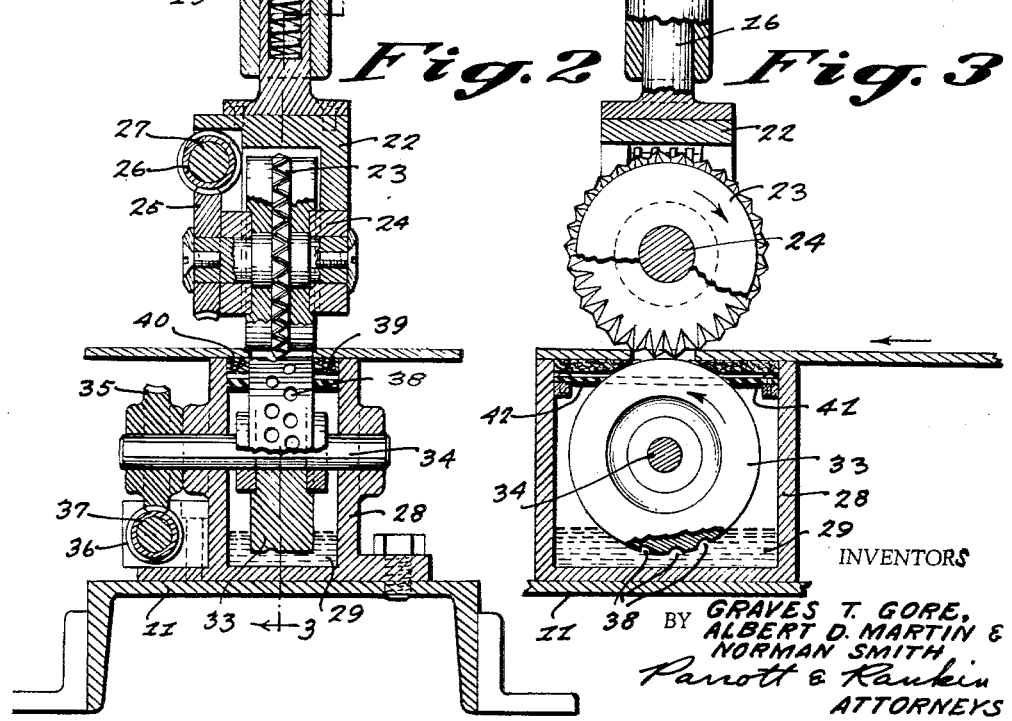
INVENTORS
GRAVES T. GORE,
ALBERT D. MARTIN &
NORMAN SMITH
BY Parrott & Rankin
ATTORNEYS United States Patent Office 3,250,245
Patented May 10, 1966

3,250,245
CUTTING AND APPLICATOR MECHANISM
Graves T. Gore and Albert D. Martin, Ware Shoals, and Norman Smith, Greenwood, S.C., assignors to Riegel Textile Corporation, a corporation of Delaware
Filed July 15, 1963, Ser. No. 295,091
3 Claims. (Cl. 118—38)

This invention relates to a mechanism for cutting a web of woven textile material and simultaneously applying spaced deposits of a ravel preventing composition along the cut edge to prevent raveling at the cut edge.

The problem of preventing raveling along a cut edge of a woven textile material has long been apparent. It has been found that this raveling may be prevented by applying spaced deposits of a suitable composition along the cut edge of the material. The resulting non-raveling textile product is disclosed in an application of Alfred T. Clifford, Graves T. Gore and Wesley K. Fooshe, Jr., filed concurrently herewith.

This discovery led to the problem of a mechanism for suitably applying the composition to the fabric simultaneously with the cutting of the fabric so as to prevent any raveling in the material following cutting. In those types of compositions which contain an evaporative organic solvent, a further problem of evaporation of the solvent was present when the composition was exposed to the atmosphere.

Various mechanisms were tried for cutting the woven textile material and simultaneously applying the composition along the cut edge. These early attempts proved unsatisfactory because of the problems of simultaneously cutting and applying the composition before the material could ravel and of evaporation of the solvent in the composition before application to the material which resulted in a building up of dried deposits on the mechanism.

In accordance with this invention, a mechanism is provided which will effectively apply small spaced deposits of a ravel preventing composition on a web of material simultaneously with the cutting of the web to prevent raveling along the cut edge following cutting. One illustrative but non-limiting example of how this is accomplished is by providing a rotary cutting or pinking wheel for cutting a web of material. Cooperating with the rotary pinking wheel is a rotary anvil-applicator wheel for serving as an anvil for the pinking wheel and for applying the spaced deposits of the composition along the cut edge. The anvil-applicator wheel is disposed partially within a reservoir which receives the composition from a supply tank. The anvil-applicator wheel has a plurality of dimples disposed on the periphery to pick up the composition in each dimple as they pass through the composition in the reservoir and to apply the composition to the material as the cut is made. To prevent evaporation of the composition in the reservoir and as it is picked up by the anvil-applicator wheel, the reservoir is substantially sealed from the atmosphere. The pinking wheel and anvil-applicator wheel are driven in synchronization by a motor and timing belt.

Further features of the invention will be understood from a consideration of the following more detailed description taken in conjunction with the accompanying drawings, in which:

FIG. 1 is a side elevation view of the mechanism of this invention;

FIG. 2 is a view taken along the lines 2—2 of FIG. 1; and

FIG. 3 is a view taken along the line 3—3 of FIG. 2.

Referring to FIG. 1, there is shown a frame or support 11 having an overhanging arm 12 secured thereto by means of bolts 13. The overhanging arm 12 includes circular bearing members 14 and 15.

Movably supported within the bearing member 15 is a shaft 16 which has a bore 17 therein extending approximately three-fourths of its length. The shaft 16 has a collar 18 which is fitted over a guide pin (not shown) in the end of bearing member 15. This arrangement prevents rotary movement of shaft 16, but allows lateral movement of the shaft 16. A spring member 20 is disposed within the bore 17 and rests on the bottom surface of the bore. Cooperating with the spring member 20 and shaft 16 is a threaded pressure regulating bolt 21. The bolt 21 is screwed into bearing 14 and extends unsecured into the top of the bore 12 into contact with the spring member 20 to bias the shaft 16 downwardly at a pressure depending on how far down the bolt 21 extends. Secured to the bottom of the shaft 16 is a U-shaped bracket 22. Pinking wheel 23 is rotatably mounted within the U-shaped bracket 22 by axle 24. Connected to axle 24 and disposed outside bracket 22 is a gear 25 for driving the pinking wheel 23. The gear 25 is driven by a worm 26 disposed on drive shaft 27 as shown in FIGS. 1 and 2. The means for driving the shaft 27 will be described hereinafter.

Secured to the front of frame 11 below the pinking wheel 23 is a reservoir 28 holding a supply of ravel preventing composition 29 therein. The composition 29 is supplied to the reservoir 28 by a flexible tube 30 leading from a supply tank 31. A float compartment 32 is disposed in the tube 30 for maintaining a constant supply of composition 29 in the reservoir 28.

Mounted partially within the reservoir 28 is an anvil-applicator wheel 33 rotatably supported on axle 34 disposed in the side walls of reservoir 28 as shown in FIG. 2. The axle 34 extends outside the side walls of the reservoir 28 and has a gear 35 fixed thereon for driving the anvil-applicator wheel 33. The gear 35 is driven by a worm 36 disposed on drive shaft 37 as shown in FIGS. 1 and 2. The means for driving the shaft 37 will be described hereinafter.

The anvil-applicator wheel 33 has a plurality of spaced dimples 38 disposed along the outside peripheral surface, as shown in FIG. 2. The dimples are adapted to pick up minute amounts of ravel preventing composition, as the anvil-applicator wheel rotates through the composition 29 in the reservoir 28 in the direction of the arrow shown in FIG. 3, to deposit the minute amounts of composition on the material as the pink cut is being made. The composition is transferred to the material by absorption. The dimples are so arranged, as shown in FIG. 2, that a minute amount of composition is transferred to the material being pinked at the base of each triangular shaped portion of the pinked cut edge to prevent raveling along the edge.

If the composition 29 is of the type which evaporates when exposed to the atmosphere and reference may be had to the above identified copending application for suitable compositions used, the reservoir 28 should be substantially sealed from the atmosphere. This is accomplished by plastic seals 39 and 40, as shown in FIG. 2, extending along each longitudinal side of the top of the reservoir 28 and contacting the sides of the anvil-applicator wheel 33. Disposed along the transverse sides of the top of the reservoir 28 are a doctor blade 41 and a scraper blade 42. The doctor blade 41 doctors the excess composition off the top of the dimples 38 as the anvil-applicator wheel 33 rotates in the direction of the arrow shown in FIG. 3. This allows an even distribution of the composition onto the material being pinked. The scraper blade 42 functions to scrape off any composition which may have been left on the periphery of the anvil-applicator wheel after the composition was applied to the material being pinked. It may be seen, that the seals 39 and 40, the doctor blade 41, and the scraper blade 42, along with the body of the reservoir 28, substantially seal the composition 29 from the atmosphere, thus reducing objectionable evaporation.

As may be seen in FIG. 1, the drive shaft 27 has a pulley 43 fixed on its outer end and drive shaft 37 has a pulley 44 fixed on its outer end. These pulleys 43 and 44 are driven in synchronization by a timing belt 45. The timing belt 45 may be driven by any convenient means, such as a main pulley 46 and belt and motor (not shown).

In operation, the material being worked on is fed into the mechanism in the direction of the arrows shown in FIGS. 1 and 3. The pinking wheel 23 and the anvil-applicator wheel 33 are driven in unison in the direction of the arrows shown in FIGS. 1 and 3 by gears 25 and 35, worms 26 and 36, drive shafts 27 and 37, pulleys 43 and 44, timing belt 45, main pulley 46, and a conventional belt and motor (not shown). Sufficient pressure is maintained between the pinking wheel 23 and the anvil-applicator wheel 33, by shaft 16, spring member 20, and pressure regulating bolt 21 to effect a pinked cut through any weight material. As the anvil-applicator wheel 33 rotates in the ravel preventing composition 29 in the reservoir 28, the dimples 38 in the peripheral surface of the anvil-applicator wheel pick up minute amounts of composition 29. As the anvil-applicator wheel continues to rotate the doctor blade 41 will doctor off excess composition from the dimples 38. The composition 29 will then be applied to the material being pinked at each point in the pinked edge, simultaneously with the cutting, by absorption to prevent raveling along the pinked edge following cutting. Any composition which has been left on the peripheral surface of the anvil-applicator wheel 33 after contact with the material will be scraped off by the scraper blade 42. The composition 29 in the reservoir 28 is substantially sealed from the atmosphere by the body of the reservoir 28, plastic seals 39 and 40, doctor blade 41, and scraper blade 42. A fresh supply of composition 29 will be maintained in the reservoir 38 by tube 30, float compartment 32, and supply tank 31.

The mechanism of this invention will effectively cut a web of woven textile material and simultaneously apply spaced deposits of a ravel preventing composition along the cut edge to prevent raveling of the material along that cut edge. This mechanism and its operation are claimed in the present application. The ravel resistant product produced by means of the mechanism of this invention or other suitable means is more fully disclosed and is claimed in the aforesaid copending application of Alfred T. Clifford, Graves T. Gore and Wesley K. Fooshe, Jr.

What is claimed is:

1. A cutting and applicator mechanism for cutting a web of textile material and simultaneously applying spaced deposits of a ravel preventing composition along the cut edge to prevent raveling at the cut edge, said mechanism comprising driven rotary cutting means, means for positive driving of said cutting means at a predetermined speed, driven rotary anvil-applicator means for cooperating with said rotary cutting means to cut the web of material and to simultaneously apply spaced deposits of composition along the cut edge, means for positive driving of said anvil-applicator means at a predetermined speed, and separate means for controlling said driving means for said cutting means and said driving means for anvil-applicator means and for positively relating the predetermined speeds of said cutting means and said anvil-applicator means so that the spaced deposits of ravel preventing composition will always be applied to the textile material at predetermined spaced locations relative to the cut edge of the textile material.

2. A cutting and applicator mechanism, as set forth in claim 1, in which said rotary cutting means comprises a pinking wheel for cutting the textile material with a pinked cut edge, and in which said rotary anvil-applicator means comprises an anvil-applicator wheel having a plurality of spaced dimples disposed in the periphery thereof to be adapted to carry a minute amount of composition for application to the web of material, said dimples being spaced around said anvil-applicator wheel so as to deposit the composition at each of the points of the cut pinked edge of the web of material.

3. A cutting and applicator mechanism for cutting a web of woven textile material and simultaneously applying spaced deposits of a ravel preventing composition along the cut edge to prevent raveling at the cut edge comprising a rotary pinking wheel, a rotary anvil-applicator wheel having a plurality of dimples in the periphery thereof, a reservoir for holding a supply of composition and being substantially sealed from atmosphere to prevent evaporation of the composition, said rotary pinking wheel being fixed on a rotary shaft, said rotary anvil-applicator wheel being fixed on a rotary shaft, a timing belt and motor for driving said shafts in synchronization, and said rotary anvil-applicator wheel being partially disposed within said reservoir so that each of said dimples may pick up a minute amount of composition as said anvil-applicator wheel passes through the composition in said reservoir for application to the web of material.

References Cited by the Examiner

UNITED STATES PATENTS

| 1,793,082 | 2/1931 | Goss | 118—261 X |
| 1,957,238 | 5/1934 | Weis | 118—38 |
| 2,787,244 | 4/1957 | Hickin | 118—259 |

CHARLES A. WILLMUTH, *Primary Examiner.*

LEON G. MACHLIN, *Assistant Examiner.*